UNITED STATES PATENT OFFICE.

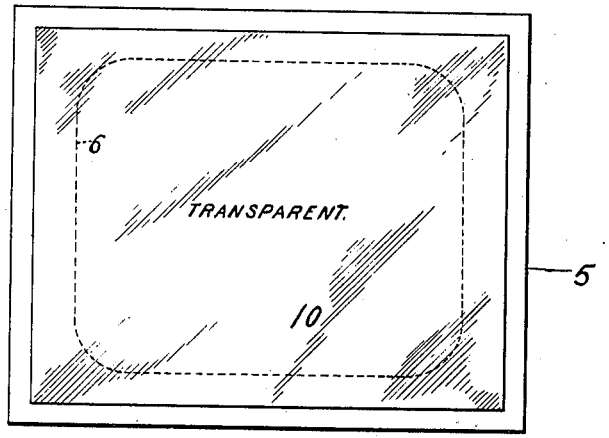
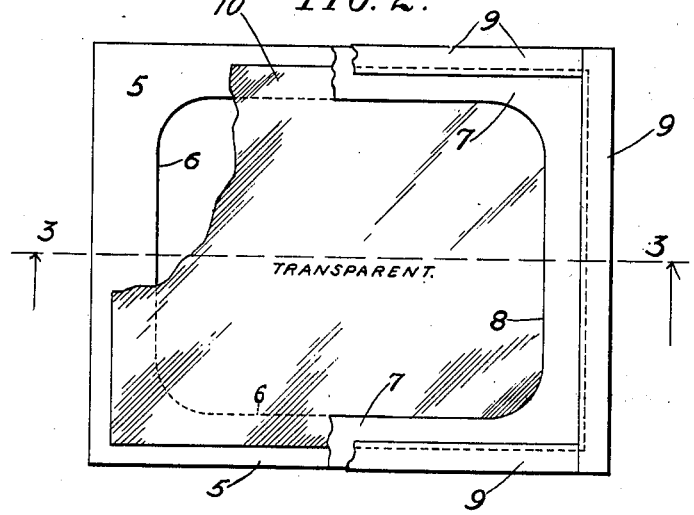
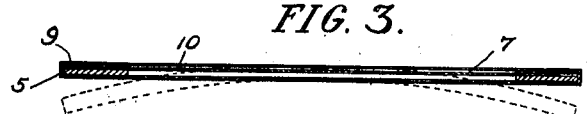
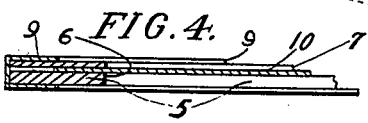

CHARLES E. BATTERSHALL AND FRANK L. OLESON, OF CHICAGO, ILLINOIS.

ANNOUNCEMENT-SLIDE FOR STEREOPTICONS.

1,018,230.      Specification of Letters Patent.      Patented Feb. 20, 1912.

Application filed September 16, 1911. Serial No. 649,628.

*To all whom it may concern:*

Be it known that we, CHARLES E. BATTERSHALL and FRANK L. OLESON, citizens of the United States, residing at Chicago, in the county of Cook and State of Illinois, have invented certain new and useful Improvements in Announcement-Slides for Stereopticons, of which the following is a specification.

This invention relates to improvements in slides of the class employed in apparatus adapted for projection, such as stereopticons and magic lanterns, whereby announcements, pictures, or other display matter is presented to view on screens, and it consists in certain peculiarities of the construction, novel arrangement and operation of the parts thereof, as will be hereinafter more fully set forth and specifically claimed.

Slides of the above named class, or for the aforesaid purpose, have heretofore generally been made of plates of glass of suitable size, on one of the surfaces of which, the pictures, announcements, or matter to be displayed on the screen, were placed in any suitable manner, but usually by photographic process or by hand, either of which operations is more or less expensive, tedious, and unsatisfactory. After such plates were so prepared, another glass plate was secured or placed on each of the surfaces on which the views were disposed to protect said views from being scratched, injured, or defaced.

By the above named old style construction of slides and method of preparing the same it is apparent that many objectionable features are encountered,—viz; the plates being made of glass and of double thickness, or two plates, are easily broken, either in handling or when exposed to the heat of the projecting machine or instrument, and besides are of such weight and so frangible as to render them unsuited as matter to be sent through the mails, and inconvenient for shipment in any suitable quantities, when otherwise transported. Furthermore, in all slides for projectors heretofore made, so far as we are aware, it has been necessary to place the view or display matter, on the slide before it, the said slide, is placed in the frame therefor, or when made of rigid glass plates, before they are secured together, which operation consumes much time, causes delay at inopportune moments and prevents the quick display of announcements in cases of emergency.

The object of the invention is to provide a slide for projecting apparatus which shall be made of such material and so constructed that the entire slide, consisting of a sheet or plate of transparent material and a frame, will be flexible, substantially non-breakable, and of very light weight as compared with slides heretofore made, thus permitting the announcements or display matter to be printed on transparent part of the slide by means of a typewriting machine or printing press, without danger of injury to the slide, and after the slide is made up, i. e., after the transparent sheet or piece thereof has been placed in its frame, for it is apparent, that, as the frame is flexible as well as the transparent sheet, the entire slide may be placed in the typewriter or printing press, and will conform to the platen of the former and roller of the latter when such is used, and that on account of the light weight and non-breakable character of the material out of which the slide is made, the same can be transported by mail in considerable quantities, if so desired.

Another object of the invention is to so construct the parts of the slide that the transparent sheet thereof will be loosely or movably held by the frame, thereby permitting expansion and contraction of the sheet incident to the heat of the projecting apparatus without warping the frame or slide and thereby causing the projected view to be distorted as would occur if the frame and sheet were rigidly secured together.

Another advantage attained by loosely mounting the sheet in the frame, is to allow finished slides to be printed in a printing press without tearing or puncturing the material.

Another object is to so make the slide that a single sheet only of transparent material is required, which arrangement allows the slide to be lettered or printed on, after the same is completely made up, which cannot be done where two glass or other kinds of transparent plates are used.

A further object is to make the slide of such material that the frame thereof will be practically non-heat absorbing so as to be safely and easily handled, without burning the fingers of the operator, and the transparent sheet of such material that it will be as transparent as glass, so that the view will be clearly defined on the screen, but flexible to the end, that it will not crack by reason of its subjection to the heat of the projecting instrument.

Other objects and advantages of the invention will be disclosed in the subjoined description and explanation.

In order to enable others skilled in the art to which our invention pertains, to make and use the same we will now proceed to describe it referring to the accompanying drawing in which—

Figure 1 is a face view of a slide embodying our invention, but showing one side only of the frame with the transparent sheet or plate located thereon. Fig. 2, is a similar view of a slide embodying the invention, showing a portion of the frame in its completed condition but a part thereof broken away to illustrate the movability of the transparent plate or sheet with respect to its frame. Fig. 3, is a sectional view taken on line 3—3, of Fig. 2, showing by dotted lines the flexibility of the entire slide, and Fig. 4, is an enlarged sectional view of a portion of the slide showing the arrangement of the parts of the frame thereof so as to permit of the movement of the transparent sheet or plate.

Like numerals of reference refer to corresponding parts throughout the different views of the drawing.

The reference numeral 5, designates one of the pieces of the frame of the slide, which piece is preferably made of cardboard and rectangular in shape as shown in the drawing, and is provided with an opening 6, through which the view or display matter on the transparent sheet may be projected. The other piece of the frame is designated by the numeral 7, and is of the same size and shape as the piece 5, and like the latter is provided with an opening 8, for the same purpose as the opening 6, in the other piece of the frame. The pieces 5, and 7, of the frame, are located one on the other and are secured together at their perimeters by means of a strip of tape 9, which overlaps the edges of the pieces 5, and 7, of the frame, and may be secured thereto by means of paste or any suitable adhesive. By this arrangement it is apparent that the inner edges or perimeters of the pieces 5, and 7, of the frame will be free so as to loosely hold the transparent sheet 10, or plate, on which the view or other display matter for projection, may be placed by being printed thereon by means of a typewriter, printing press, or otherwise.

The transparent plate or sheet 10, may be made of any suitable flexible transparent material, but preferably of cellophane which is as transparent as glass, thin and flexible like paper, yet will not crack when subjected to the heat of the projecting apparatus. This sheet as is clearly shown in the different figures of the drawing, is considerably smaller than the pieces 5, and 7, of the frame, and may be inserted between said pieces before the marginal tape or securing strip 9, is fastened to said pieces.

By making the sheet or plate 10, smaller than the pieces 5, and 7, of the frame it is obvious that the transparent sheet or plate will have movement in all directions within the frame, and that when the frame and transparent sheet are subjected to heat, the expansion and contraction of said parts will be independent of each other so that there will be no warping of the frame or transparent sheet to cause distortion of the projected view.

By reference to Fig. 4, of the drawing, it will be seen that the piece 7, of the frame, is made of thinner material than the piece 5, so that the latter will act as a body or support for the flexible transparent sheet 10, while the piece 7, will act as a retainer or holder for the edges of said transparent sheet, but it will be understood that the pieces 5, and 7, clamp the sheet 10, sufficiently to hold its edges straight and normally flat, yet will permit of free movement of the said sheet when the slide is placed in a typewriter or printing press for having the announcement or view printed thereon, which by reason of the flexibility of the parts of the slide will permit this to be done after the slide has been finished. As before stated, the pieces 5, and 7, as well as the tape or strip 9, are made of flexible material, the pieces 5, and 7, by preference being made of cardboard or fiber which is opaque and to some extent non-heat-absorbing, while the strip 9, is preferably of cloth which is also of a less heat absorbing character than metal.

Having thus fully described our invention, what we claim as new and desire to secure by Letters Patent is—

As an article of manufacture, a slide for stereopticons and the like consisting of a frame including two superposed flexible pieces each having an opening and a flexible binder and the outer edges of said pieces, and a transparent flexible sheet movably mounted between the frame pieces and extended across the openings therein, said pieces acting to normally hold the sheet flat, but to allow of its movement independently of the frame.

CHARLES E. BATTERSHALL.
FRANK L. OLESON.

Witnesses:
CHAS. C. TILLMAN,
E. NEWSTROM.